United States Patent [19]
Motose et al.

[11] Patent Number: 6,058,907
[45] Date of Patent: May 9, 2000

[54] CONTROL FOR DIRECT INJECTED TWO CYCLE ENGINE

[75] Inventors: Hitoshi Motose; Masahiko Kato, both of Hamamatsu, Japan

[73] Assignee: Sanshin Kogyo Kabushiki Kaisha, Japan

[21] Appl. No.: 09/188,953

[22] Filed: Nov. 10, 1998

[30]      Foreign Application Priority Data

Nov. 10, 1997   [JP]   Japan ..................................... 9-321973

[51] Int. Cl.⁷ ...................................................... F02B 5/00
[52] U.S. Cl. ........................................ 123/305; 123/73 C
[58] Field of Search ................................... 123/305, 295, 123/301, 73 C, 257

[56]                References Cited

U.S. PATENT DOCUMENTS 5,553,579   9/1996   Yoshida et al. ......................... 123/295
5,638,779   6/1997   Atmur et al. ....................... 123/65 BA
5,699,766   12/1997  Saito ........................................ 123/257

*Primary Examiner*—Mahmoud M. Gimie
*Attorney, Agent, or Firm*—Knobbe, Martens, Olson & Bear, LLP

[57]                    ABSTRACT

A direct injection system and control methodology for two-cycle crankcase compression engines wherein the injection timing is advanced from those normally utilized to avoid the incomplete combustion that results from the prior art method. The injection timing is advanced so that it occurs while the exhaust port is still open but it is timed in such a way that the injected fuel will not be swept out of the exhaust port before the exhaust port closes. The initiation of injection timing is adjusted in response to certain parameters such as engine speed and the volume of intake air flow. In addition, the effects of other cylinders sharing a common exhaust manifold is also compensated for.

8 Claims, 8 Drawing Sheets

CONTROL FOR DIRECT INJECTED TWO CYCLE ENGINE

BACKGROUND OF THE INVENTION

This invention relates to a direct cylinder injected, two cycle, internal combustion engine and more particularly to an improved control for such engines.

The advantages afforded by the simplicity of two cycle engines is well recognized. Also, the ability of these engines to produce greater horsepower per displacement than four cycle engines due to their firing every cycle of rotation is acknowledged. However, because of the overlap in the scavenging and exhaust cycles and other factors, environmental concerns are making the use of two cycle engines more difficult.

One way in which the performance of a two cycle engine can be significantly improved and, at the same time, the fuel economy and exhaust emission control can be improved is through the use of direct cylinder fuel injection. With this type of injection system, fuel is injected directly into the combustion chamber for combustion therein. By utilizing direct cylinder injection, it may be possible to obtain stratification of the charge and, accordingly, exhaust emission and fuel economy improvement.

However, the fact that exhaust port is opened during a portion of the intake or scavenging cycle gives rise to the possibility that injected fuel can be swept out of the exhaust port. Therefore, it has generally been the practice to inject the fuel very late in the compression cycle and oftentimes fuel injection begins immediately after the exhaust port is closed and before the piston has reached its top dead center position. Such a practice will ensure that fuel does not pass out of the exhaust port.

However, this early injection of fuel, particularly under lower speed and load conditions gives rise to a very great difficulty in obtaining proper mixing in the combustion chamber. That is, when the fuel is injected late, there is less turbulence and airflow in the combustion chamber. This result in poor mixing and incomplete combustion.

It is, therefore, a principal object of this invention to provide an improved direct injected two cycle engine and operating strategy.

It is a further object of this invention to provide a fuel control arrangement for a direct injected two cycle engine wherein the timing of the fuel injection is governed so as to ensure that fuel will not pass out of the exhaust port but also so that the fuel is well mixed in the combustion chamber before ignition timing.

Because of the more frequent firing pulses of two cycle engines, there is also a cylinder to cylinder effect that is greater with two cycle engines than with four cycle engines. That is, if the exhaust ports of several cylinders are served by a common exhaust manifold, the overlap in the exhaust port timing and the exhaust pulses in the system can give rise to effects in one cylinder caused by the exhaust pulses from another cylinder. At times this is used to obtain improved engine performance through a technique which is sometimes referred to as "exhaust supercharging."

However, this concept also can mean that if each cylinder has this injection timing and duration controlled independently of the others, then the desired conditions may not be maintained in a single cylinder.

It is, therefore, a still further object of this invention to provide a fuel injection control for a direct cylinder injected two cycle engine having multiple cylinders wherein the injection control is based on effects caused by cylinders other than that in which the fuel is being injected.

SUMMARY OF THE INVENTION

This invention is adapted to be embodied in a two cycle crankcase compression internal combustion engine. The engine is comprised of an engine body that defines a cylinder bore in which a piston reciprocates. The cylinder bore is provided with at least one scavenge port and at least one exhaust port that are opened and closed by the reciprocation of the piston in the cylinder bore. A fuel injector is mounted so that it sprays its fuel directly into the combustion chamber formed by the piston and the engine body.

In accordance with a first feature of the invention, the fuel injection timing is controlled so that the beginning of fuel injection is initiated at a time between the time period when a substantially maximum injection allowable angle determined by the length of time or crankshaft rotation between the beginning of fuel injection and the time when the injected fuel would reach the exhaust port and the point at which the exhaust port closes.

Another feature of the invention is adapted to be embodied in an engine having multiple cylinders where the exhaust ports of those multiple cylinders communicate with a common exhaust manifold. In accordance with this feature of the invention, the beginning of injection timing is adjusted to a degree that depends upon the operation of the other cylinders.

DETAILED DESCRIPTION OF THE PREFERRED EMBODIMENTS OF THE INVENTION

Figure 1:
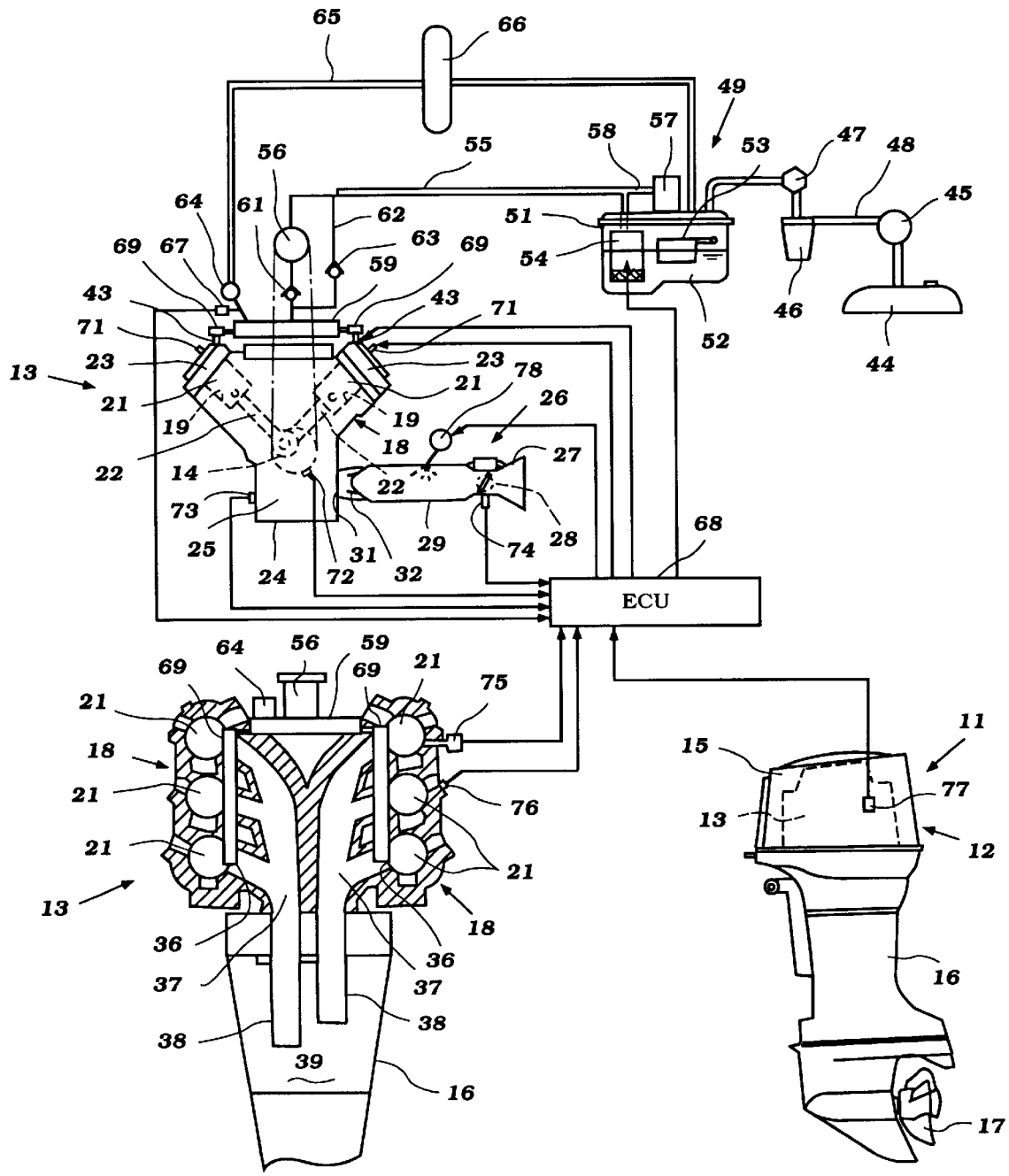
FIG. 1 is a partially schematic view having three portions that are connected by the controlling ECU of the engine. The lower right hand portion of this view shows a side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower left hand portion of this view illustrates a side elevational and outboard motor that is constructed and operated in accordance with the invention. The outboard motor is indicated generally by the reference numeral 11 and except as will hereinafter be noted maybe considered to be of a generally conventional construction.

The outboard motor 11 is comprised of a power head 12 that contains a powering internal combustion engine 13. As best seen in the other two portions of this figure, the engine 13 is, in the illustrated embodiment, of the V6 type and operates on a two stroke crankcase compression principal. Although the number of cylinders and cylinder orientation can be varied, the invention has particularly utility in connection with two cycle engines and particularly those having multiple cylinders.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 is coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention.

Referring now primarily to the lower left hand view and the upper view, the engine 13 includes a cylinder block, indicated generally by the reference numeral 18. Because of the V-type configuration employed in the illustrated embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 21. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of this figure and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow.

Referring now additionally to FIGS. 2–5, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34 and 35. As is well known in two cycle practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left hand portion of FIG. 1, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into an expansion chamber 39 formed in the driveshaft housing and lower unit 16. This expansion chamber 39 communicates with a suitable high speed underwater exhaust gas discharge and a low speed above-the-water exhaust gas discharge of any known type. The particular type of exhaust system employed does not form any part of the invention although the invention does have utility in connection with engines having multiple cylinders and arrangements wherein a plurality of exhaust ports of those cylinders communicate with a common exhaust manifold.

Figure 2:
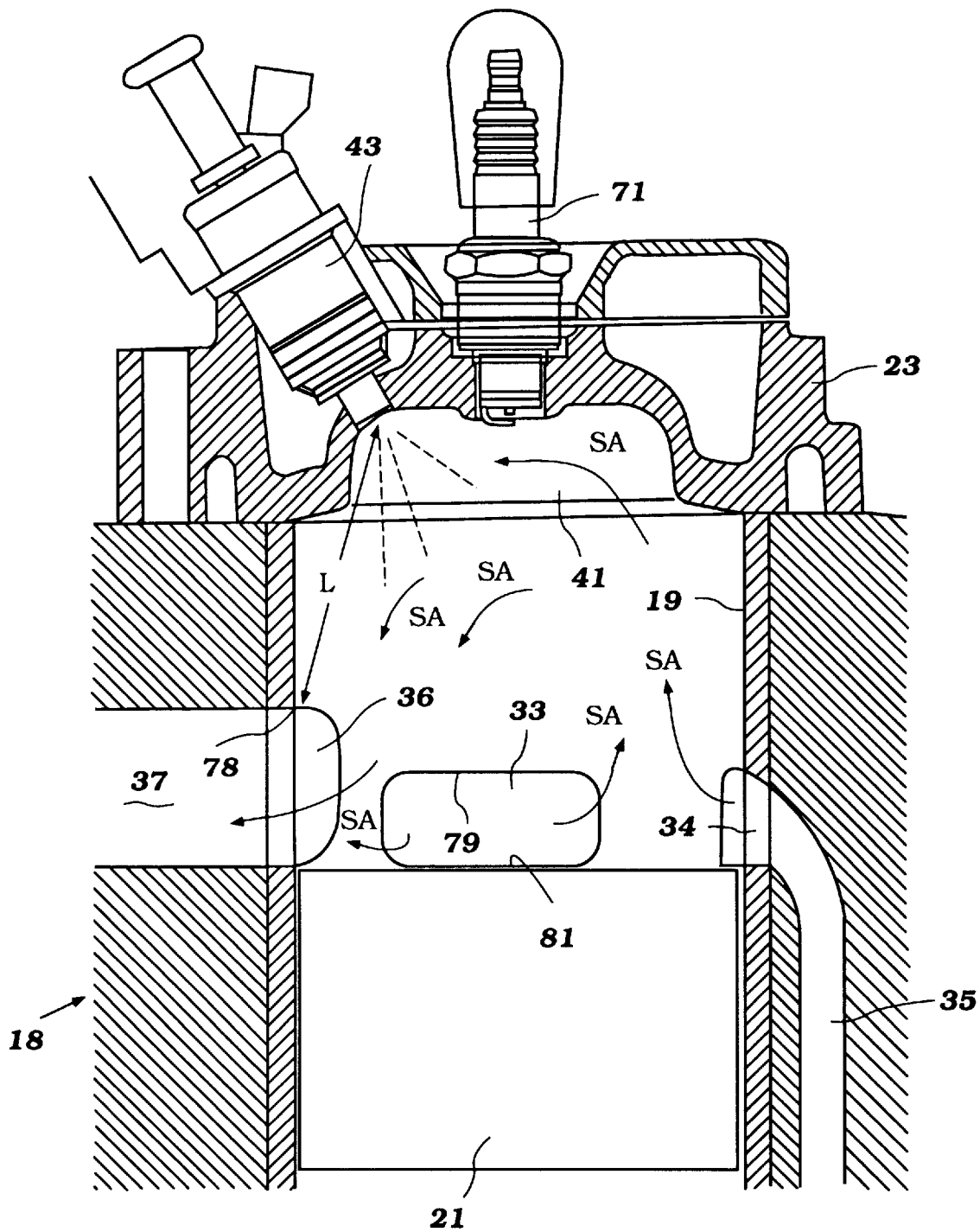
FIG. 2 is an enlarged cross-sectional view taken through a single cylinder of the engine and depicts part of the theory by which the control strategy operates.
Figure 3:
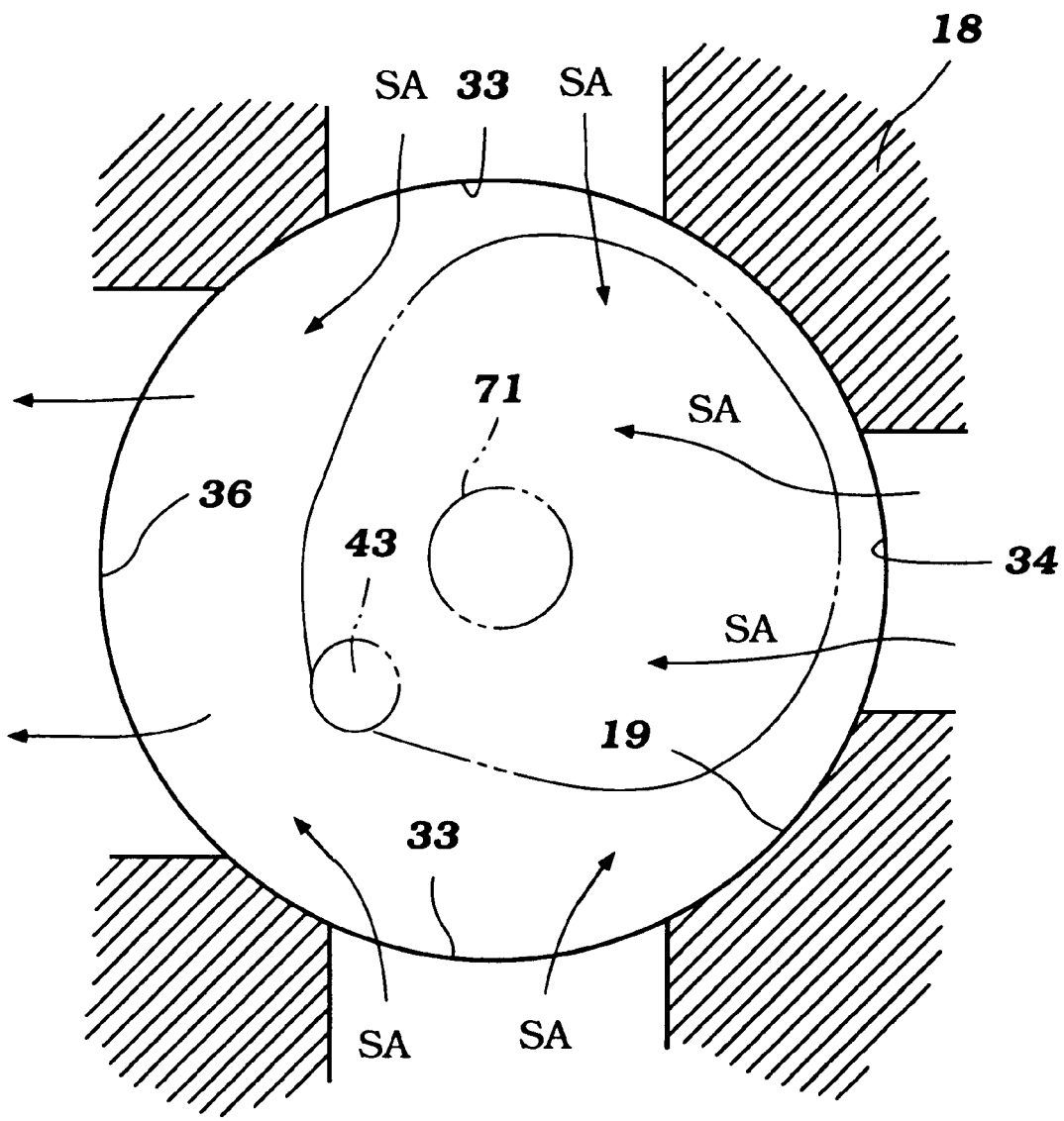
FIG. 3 is a cross-sectional view taken through the cylinder shown in FIG. 2 to show the scavenging air flow pattern and the path of injected fuel.
Figure 4:
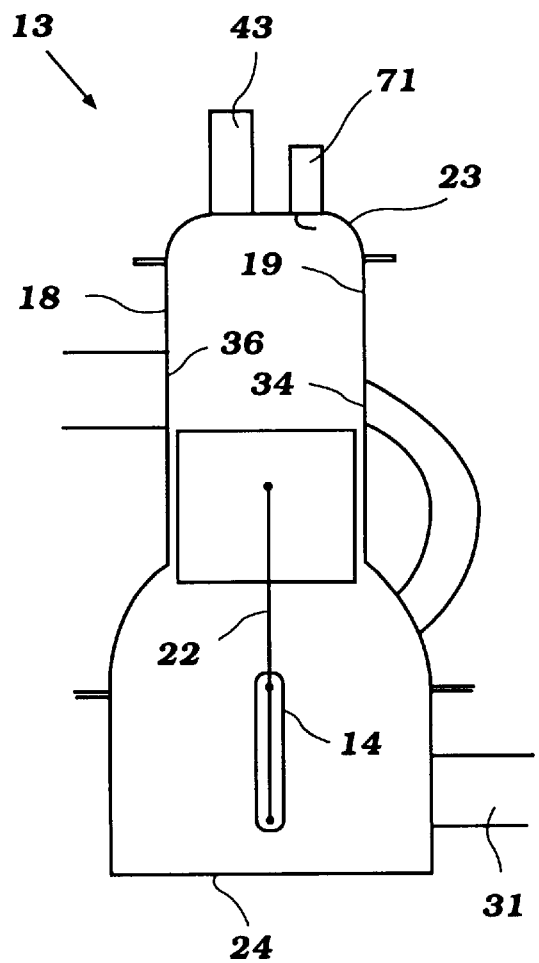
FIG. 4 is a partially schematic view taken generally in the same direction as FIG. 2 and shows the piston at its bottom dead center position.

As the pistons 21 move downwardly in their cylinder bores 19 toward the bottom dead center position shown in FIG. 4, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIGS. 2 and 3 by the arrows SA.

In accordance with an important feature of the invention, the engine 13 is provided with a direct cylinder fuel injection system. This fuel injection system is shown in parts schematically in the upper portion of FIG. 1 and will now be described by particular reference to that figure. Before referring thereto, however, it should be noted that fuel injectors 42 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 47 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 47 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in the main fuel manifold 59 and limits the maximum pressure of the fuel supply to the fuel injectors 43. This is done by dumping fuel back to the vapor separator assembly 49 through a return line 65. A fuel heat exchanger or cooler 66 may be provided in this return line 65 so as to ensure that the fuel is not at too high a temperature.

A pressure sensing device 67 is provided also in the main fuel manifold 59 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIG. 2, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 2 and in a pattern as shown by the phantom line view of FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 may operate on a feedback control condition and thus, an air fuel ratio sensor 75 is provided that communicates with the combustion chambers or exhaust port of at least one of the cylinder. Preferably, an oxygen sensor is utilized for this purpose, although other types of devices may be employed.

Engine temperature is sensed by a engine temperature sensor 76.

The temperature of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

The system as thus far described may be considered to be conventional and for that reason, where any component has not been illustrated or described in detail, reference may be had to conventional or known structures with which to practice the invention. The invention deals primarily with the timing of beginning of fuel injection, particularly under low speed and low load conditions. This may be understood by first referring to the timing diagram shown in FIG. 6.

Figure 5:
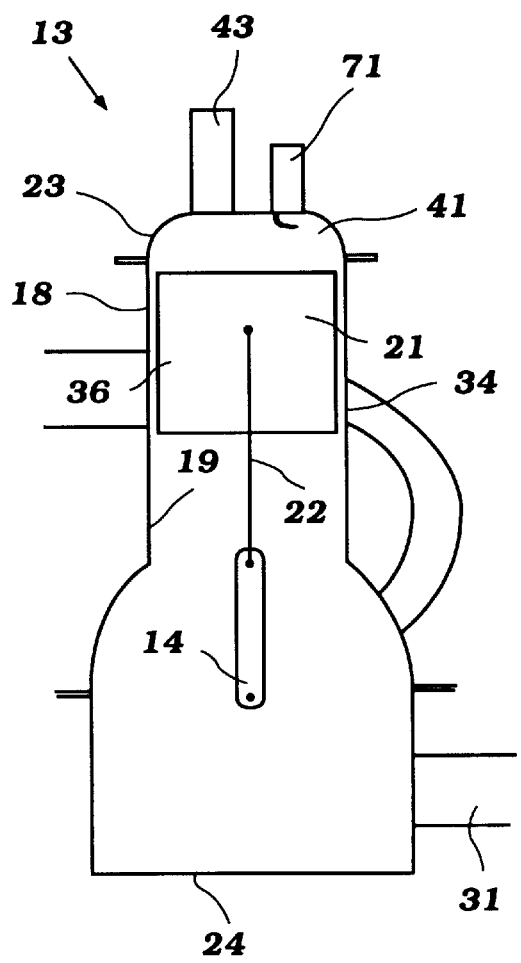
FIG. 5 is a view, in part similar to FIG. 4 and shows the piston at its top dead center position.
Figure 6:
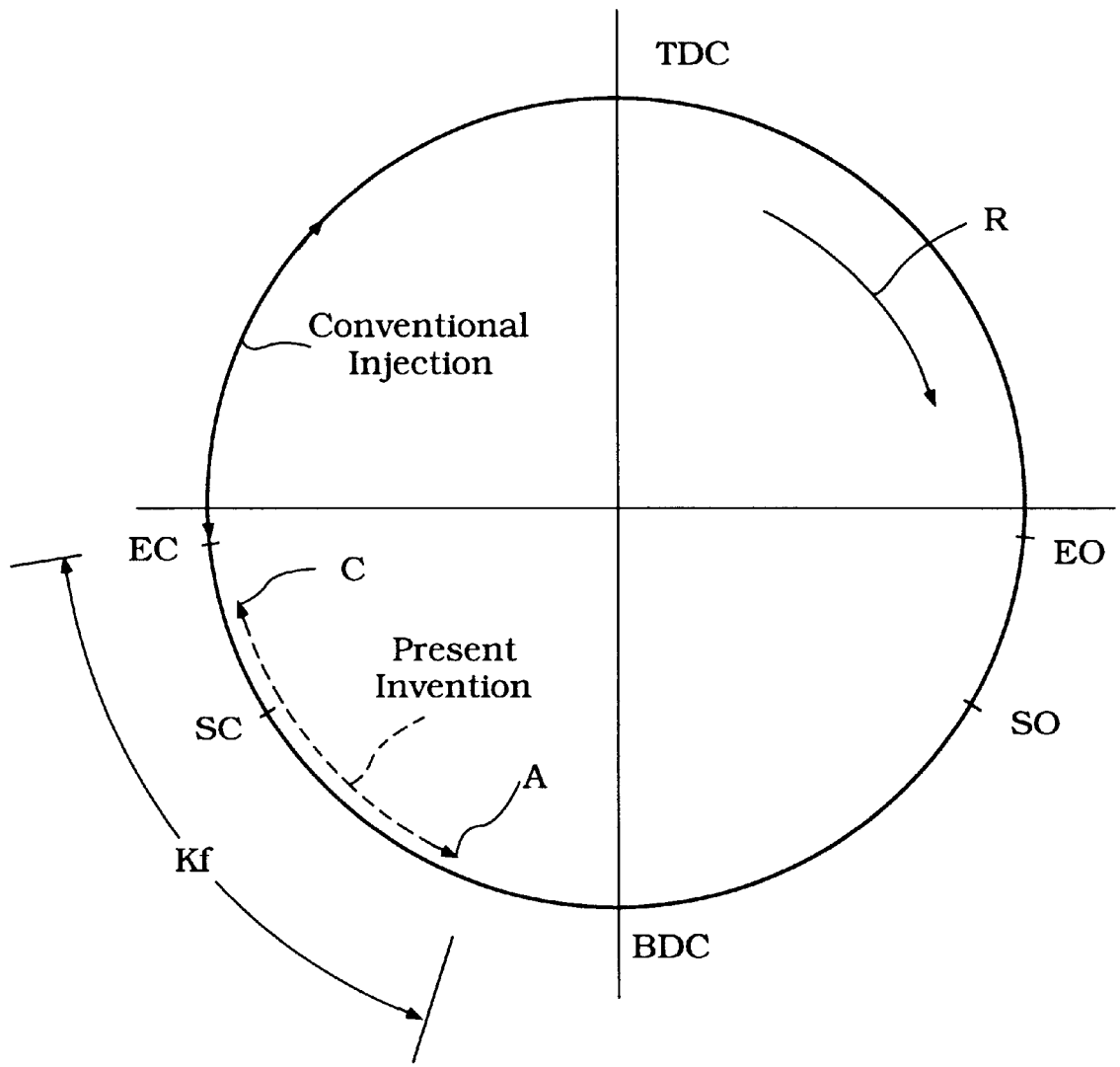
FIG. 6 is a timing diagram showing the fuel injection strategy in accordance with the invention in relation to crank angle and also the prior art type of strategy.

The direction of crankshaft rotation is indicated by the arrow R and the piston top dead center position, as shown in FIG. 5, is indicated at TDC in FIG. 6. Bottom dead center position (FIG. 4) is indicated in FIG 6 as BDC. This figure also shows the timing of opening of the scavenge and exhaust ports and their respective closing. The opening of the exhaust ports 36 occurs when the piston passes the upper edge 78 (FIG. 2) of the exhaust port 36. This point is indicated as EO in FIG. 6.

As the pistons 21 continue their downward movement eventually the scavenge ports will open when their upper edges 79 are opened by the downward movement of the pistons 21. This point appears in FIG. 6 as SO.

The scavenging operation continues when the piston 21 passes bottom dead center and begins to move upwardly to begin to close the scavenge ports 33 and 34 by passing their lower edges 81. Full closure of the scavenge ports occurs at the point SC in FIG. 6 when the piston again passes the upper edge 79 of the scavenge ports 33 and 34. Finally, the exhaust ports 36 are closed when the pistons 21 pass their upper edges 78 at the point EC.

With conventional engine injection strategies, the fuel injection is begun generally almost immediately after the exhaust ports 36 are closed with the duration being determined by the load on the engine. This is shown in FIG. 6. As may be seen in FIG. 3, the scavenge air flow acts so as to take the fuel patch and drive it toward the exhaust port 36. Thus, the conventional practice is to cause the injection to happen late in the cycle before the piston reaches top dead center and immediately before firing. As more fuel is required, the injection duration is extended. However, this may cause the fuel to travel to the exhaust port before combustion has been completed and when the exhaust port again opens some unburned fuel may escape.

Also the velocity of air flow in the combustion chamber at this time is relatively low and there will be poor mixing of fuel with the air. The low air velocity also results in poor flame propagation and poor and/or incomplete combustion results.

In accordance with the invention, the injection timing is initiated before a point where the injected fuel path toward the exhaust port 36 and specifically its upper edge 78 along a dimension indicated at L in FIG. 2 and considering the air flow within the combustion chamber will not reach the exhaust port before it has fully closed. This time is referred as the "fuel reachable time or angle of crank rotation". This fuel reachable time Tf in seconds is the time period for arrival of the fuel to the exhaust port and is determined by dividing the distance L by the speed of fuel as injected Vf.

$$Tf = L/Vf$$

Assuming the engine speed is in rpm, the fuel reachable angle, Kf, which the crankshaft rotates within the fuel reachable time, Tf, is obtained by multiplying Tf by engine speed, n, by 360° and divided by 60.

$$Kf = (Tf \times n \times 360)/60$$

As a specific example, if the engine is running in a condition wherein the fuel reachable angle Kf will be 60° if the fuel reachable timing is 2.5 milliseconds and the engine speed is 4000 rpm.

Thus, in accordance with the invention, the fuel injection is initiated at a time A after bottom dead center and before exhaust port closing and continuing to the point C which is a point again before the exhaust port closes. Thus, to further ensure that fuel will not pass out of the exhaust port before it closes, the beginning of fuel injection at the point A or the actual fuel reachable angle Kf is compensated by an amount a which is in the direction opposite to the direction of crankshaft rotation. In other words, the time of beginning of injection is advanced.

Figure 8:
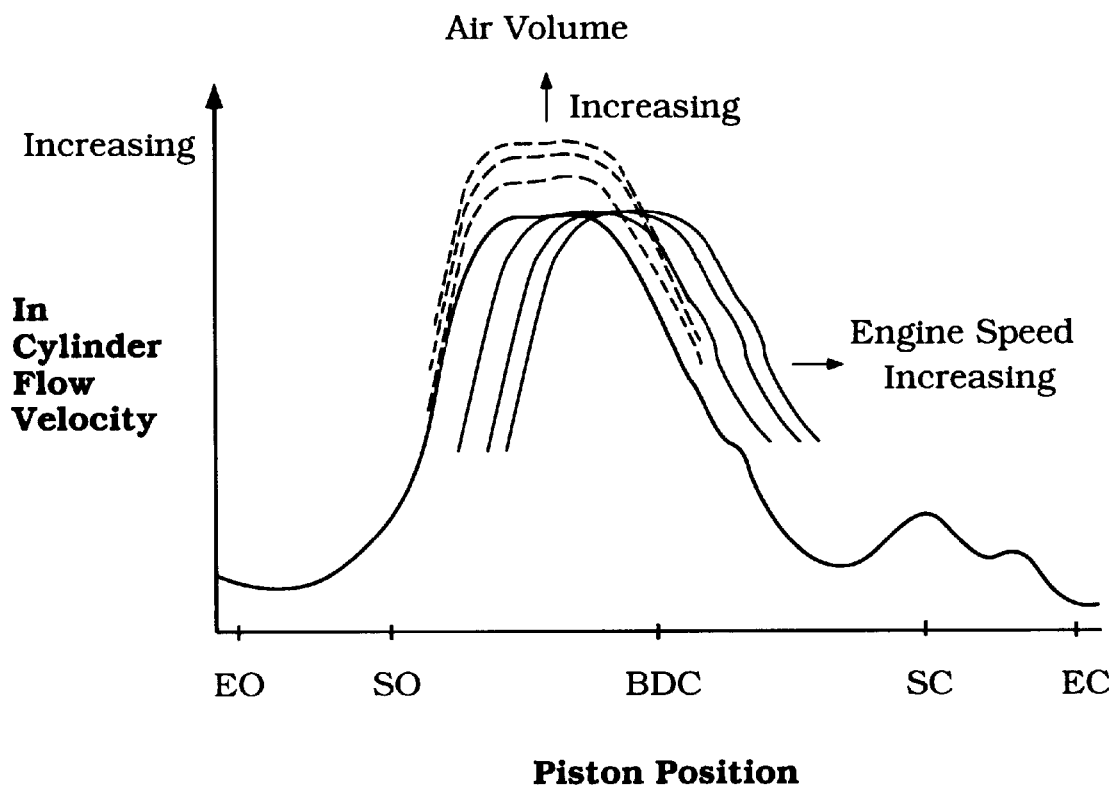
FIG. 8 is a graphical view that shows the air flow speed inside the cylinder during a cycle of operation with engine speed variations being shown by a family of solid line curves and air volume effects in broken line curves.

By doing this, it is possible to obtain better mixing of the fuel and air thus making a substantial reduced reduction in the amount of hydrocarbon emissions by improving combustion and combustion efficiency. Also, by advancing the timing of injection start from that conventionally employed, the airflow velocity within the cylinder is higher, as seen in FIG. 8 and, therefore, fuel mixing is further improved.

Figure 7:
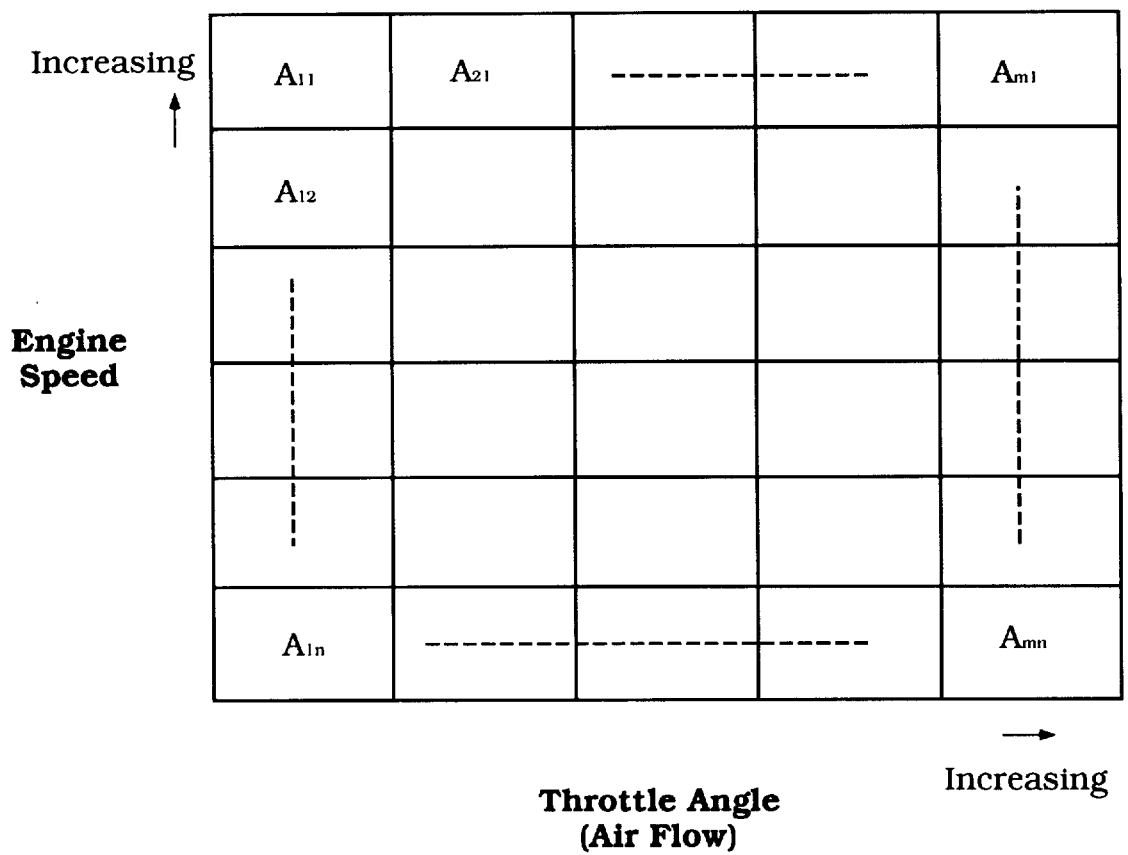
FIG. 7 is a map showing the memory conditions in the ECU for determining the beginning timing of fuel injection.

The actual timing of beginning of fuel injection A is developed from a map of the type shown in FIG. 7 wherein the timing of injection is dependent upon engine speed and air flow. In this specific embodiment, air flow is determined by throttle angle, although other measurements or parameters may be utilized.

Basically, if engine speed increases, the value of A increases and if engine air flow increases, this means that there will be a longer injection timing to obtain the desired fuel/air ratio and the injection completion time C would be delayed. Therefore, the beginning of injection timing is advanced as air flow is increased so as to preclude the fuel injection taking place after the exhaust port is closed.

The duration of the fuel injection can be set by any desired control strategy. However the time or crank angle C when injection is completed will be determined by the time injection is initiated.

FIG. 8 is a graphical view that shows the engine air flow speed in the cylinder depending upon the position of the piston. As may be seen, the air flow velocity increases abruptly after the scavenge port opens and then falls off after bottom dead center and continues to diminish when the scavenge ports are closed and also when the exhaust port closes. Thus, by injecting later than exhaust port closing as is done with prior art methods, there will be low turbulence in the combustion chamber and poor mixing will result. However, by injecting in accordance with the invention at a time before the scavenge port closes and as soon as possible after bottom dead center, then the velocity will be still high and good mixing will result.

As may be seen in this figure, as the air volume increases, there is a greater velocity of air flow. Also, as engine speed increases, the air flow velocity curve shifts slightly so as to peak closer to bottom dead center. Because of the fact that the air velocity in the combustion chamber increases, then there is a likelihood that the scavenge air flow may cause the fuel to be delivered to the exhaust port before it closes. Therefore, there is a compensation factor γ that is applied so as to subtract from the fuel reachable angle Kf so as to change the injection timing to avoid fuel being swept from the exhaust port before it closes.

Figure 9:
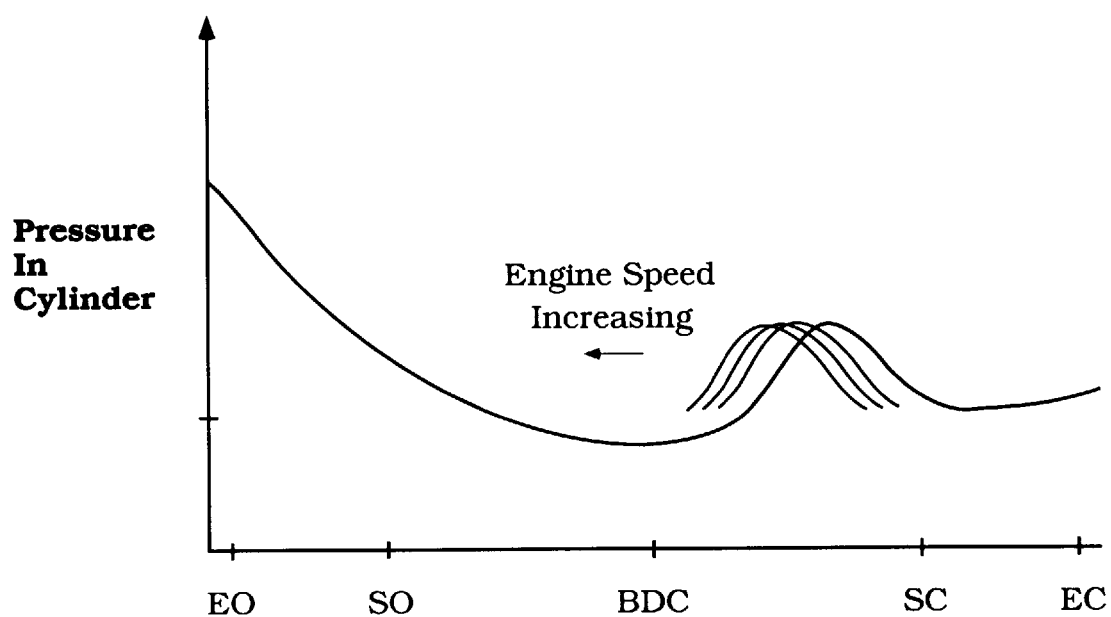
FIG. 9 is a view showing the pressure in the cylinder during a cycle and shows how the peak pressure variations after bottom dead center vary depending upon engine speed.

There is another factor that affects the conditions within a given cylinder in two-cycle engines where several cylinders are served by a common exhaust manifold, as aforenoted. This condition is shown in FIG. 9 wherein it illustrates the pressure inside of a cylinder and the effect of other cylinders which cause a brief pressure increase in the cylinder at a time after bottom dead center and before the scavenge port and exhaust ports close. This pressure pulse caused from another cylinder varies with engine speed and it will be seen that the pulse occurs earlier as the engine speed increases. Therefore, in accordance with another feature of the invention, because of this pressure peak injection speed will be slowed and thus the injection timing can be advanced by adding a compensation value β to the fuel reachable angle Kf.

Thus, from the foregoing description it should be readily apparent that the injection control strategy described is very effective in providing good engine combustion and complete mixing of the fuel with the air and rapid flame propagation so as to avoid the incomplete combustion that results with a prior art type of arrangement.

Of course, the foregoing description is that of preferred embodiments of the invention and various changes may be made without departing from the spirit and scope of the invention as defined by the appended claims.

What is claimed is:

1. A two cycle crankcase compression internal combustion engine comprised of an engine body that defines a cylinder bore, a piston reciprocating in said cylinder bore, said cylinder bore being provided with at least one scavenge port and at least one exhaust port that are opened and closed by the reciprocation of said piston, a fuel injector mounted in said engine body for injecting fuel directly into a combustion chamber formed by said piston and said engine body, means for supplying fuel under pressure to said fuel injector, and means for controlling the timing of fuel injection so that the beginning of fuel injection is initiated at a time between a time period beginning at a substantially maximum injection allowable angle and terminating at the time said exhaust port closes, and the substantially maximum injection allowable angle is determined by the length of time of crankshaft rotation angle between the beginning of fuel injection and the time when the infected fuel would reach said exhaust port.

2. A two cycle crankcase compression internal combustion engine as set forth in claim 1 wherein the time period beginning when a substantially maximum injection allowable angle determined by the length of time between the beginning of fuel injection and the time when the injected fuel would reach the exhaust port is Tf, the distance between the nozzle of the fuel injector and the opening edge of the exhaust port is L, the speed of fuel as injected is Vf and the following is true:

$$Tf=L/Vf.$$

3. A two cycle crankcase compression internal combustion engine as set forth in claim 2 wherein the fuel injection is begun after the calculated beginning time under normal engine running.

4. A two cycle crankcase compression internal combustion engine as set forth in claim 1 wherein the beginning of fuel injection is adjusted with variations in engine speed.

5. A two cycle crankcase compression internal combustion engine as set forth in claim 1 wherein the beginning of fuel injection is adjusted with variations in the amount of air flow to said engine.

6. A two cycle crankcase compression internal combustion engine as set forth in claim 5 wherein the beginning of fuel injection is also adjusted with variations in engine speed.

7. A two cycle crankcase compression internal combustion engine as set forth in claim 1 wherein the engine has a plurality of cylinders and their exhaust ports communicate with a common exhaust manifold and the beginning of fuel injection is adjusted to compensate for the effect of another combustion chamber.

8. A two cycle crankcase compression internal combustion engine as set forth in claim 1 wherein the beginning of fuel injection is adjusted with variations in air velocity in the combustion chamber.

* * * * *